US007131200B2

(12) United States Patent
Lin et al.

(10) Patent No.: US 7,131,200 B2
(45) Date of Patent: Nov. 7, 2006

(54) METHOD FOR MAKING A RADIATING APPLIANCE

(75) Inventors: Hsin-Cheng Lin, Taipei County (TW); Nai-Jen Hsu, Taipei (TW)

(73) Assignee: Asia Vital Components Co., Ltd., Kaohsiung (TW)

( * ) Notice: Subject to any disclaimer, the term of this patent is extended or adjusted under 35 U.S.C. 154(b) by 422 days.

(21) Appl. No.: 10/759,305

(22) Filed: Jan. 20, 2004

(65) Prior Publication Data

US 2004/0194310 A1    Oct. 7, 2004

(30) Foreign Application Priority Data

Feb. 14, 2003    (TW) ............................... 92103041 A (51) Int. Cl.
*B23K 31/00*    (2006.01)
*B23K 20/02*    (2006.01)
*B23P 15/26*    (2006.01)
*B21D 53/08*    (2006.01)
(52) U.S. Cl. ..................... 29/890.038; 29/890.035; 29/890.043; 29/890.054; 228/262.21
(58) Field of Classification Search ........... 29/890.038, 29/890.043, 890.054, 890.035; 228/262.1, 228/262

See application file for complete search history.

(56) References Cited

U.S. PATENT DOCUMENTS 6,661,660 B1 * 12/2003 Prasher et al. .............. 361/700

FOREIGN PATENT DOCUMENTS

DE           41653 A1 * 12/1981
GB        157370 A2 *  3/1985

* cited by examiner

*Primary Examiner*—David P. Bryant
*Assistant Examiner*—Sarang Afzali
(74) *Attorney, Agent, or Firm*—Birch, Stewart, Kolasch, and Birch, LLP (57) ABSTRACT

A radiating appliance consisting of a plurality of heat-transfer tubes, radiators, and a heat-transfer plate is processed in a method including the following steps: position the heat-transfer tubes in grooves formed in a recess on one radiator; position the heat-transfer plate in front of the recess to locate above the heat-transfer tubes; and drive a heated flat pressure plate to press the heat-transfer plate into the recess and flatten the heat-transfer tubes, as well as melt paste tin positioned in the grooves below the heat-transfer tubes, so that the heat-transfer tubes and the radiator have increased contact area between them, and the molten paste tin firmly bonds the heat-transfer tubes, the radiator, and the heat-transfer plate to one another to form the radiating appliance.

7 Claims, 8 Drawing Sheets

METHOD FOR MAKING A RADIATING APPLIANCE

This Nonprovisional application claims priority under 35 U.S.C. § 119(a) on Patent Application Ser. No(s). 092,103,041 filed in TAIWAN on Feb. 14, 2003, the entire contents of which are hereby incorporated by reference.

FIELD OF THE INVENTION

The present invention relates to a processing method for radiating appliance. In the method, a flat pressure plate is heated to press a plurality of heat-transfer tubes against a radiator, so that the tubes are flattened to have increased contact area with the radiator, and paste tin positioned below the heat-transfer tubes is molten at the same time to firmly bond the radiator and the heat-transfer tubes to each other.

BACKGROUND OF THE INVENTION

To effectively solve the problem of large amount of heat generated by machines, fans or radiators are usually mounted on the heat-generating machines to reduce the heat. And, to effectively increase the heat-radiating efficiency, the radiators are further provided with heat-transfer tubes, which have heat conductivity ten times as high as that of general metal material and can therefore effectively solve the problem of heat dissipation. Generally, the heat-transfer tubes are mounted on the radiator with their heat-dissipating ends located higher than their heat-receiving ends, in order to obtain the best radiating effect. That is, when the heat-transfer tubes are bent by 90 degrees with the heat-dissipating ends turned upward, the best radiating effect may be obtained.

Since the heat-transfer tube usually has a round cross section, the heat-receiving end of the tube is preferably flattened corresponding to the shape of the radiator to increase the contact surface between the heat-transfer tube and the radiator. Moreover, paste tin is further applied between the heat-transfer tubes and the radiator to minimize the clearance therebetween and thereby increases the overall radiating efficiency. The flattening of the heat-transfer tubes and the application of the paste tin are usually two separate steps in the processing of a radiating appliance. This would increase the processing procedures and reduce the productivity of the radiating appliance.

It is therefore tried by the inventor to develop a processing method for radiating appliance to eliminate the above-mentioned drawbacks.

SUMMARY OF THE INVENTION

A primary object of the present invention is to provide a processing method for radiating appliance, in which a plurality of heat-transfer tubes and a heat-transfer plate are simultaneously fixed onto a radiator.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
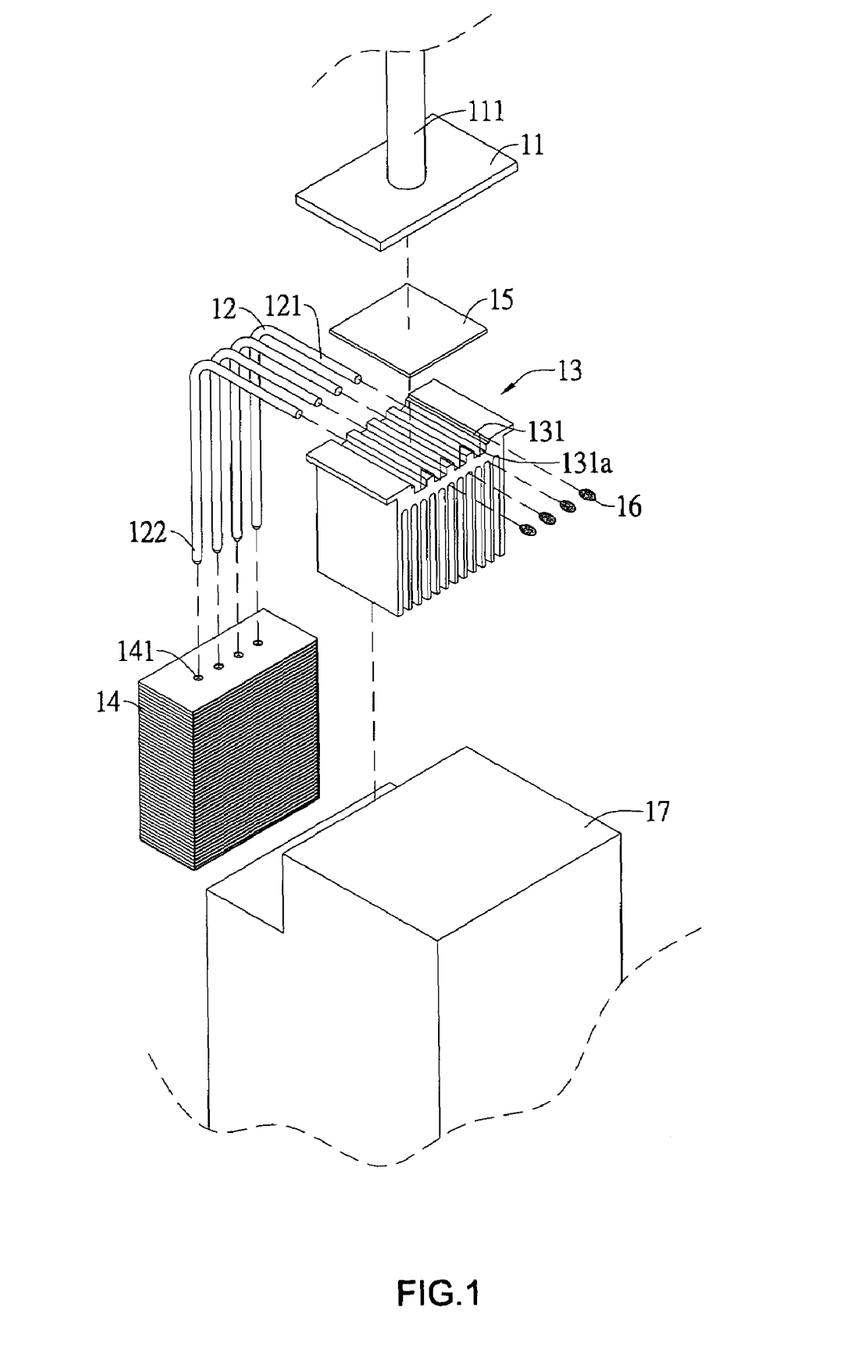
FIG. 1 is an exploded perspective view of a radiating appliance to be processed using the method of the present invention.

Please refer to FIG. 1 that is an exploded perspective view of a radiating appliance to be processed using a method of the present invention. As shown, the radiating appliance includes a first radiator 13, at a bottom of which a recess 131 having a plurality of parallel grooves 131a formed therein is provided; a second radiator 14 provided with a plurality of vertically extended through holes 141 corresponding to the grooves 131a; a plurality of round-sectioned heat-transfer tubes 12 in the number corresponding to that of the grooves 131a and the through holes 141, and being separately bent at predetermined positions to a right angle; and a heat-transfer plate 15 made of a material having excellent heat transfer capability, such as copper, and having a shape corresponding to the recess 131. To assemble the first radiator 13, the second radiator 14, the heat-transfer tubes 12, and the heat-transfer plate 15 together using the method of the present invention, a flat pressure plate 11 made of a material having excellent heat transfer capability, such as copper, is provided. A driving arm 111 is connected to a back of the flat pressure plate 11 for driving the latter to move and apply a pressure. A fixing table 17 is prepared for supporting the radiators 13, 14 thereon. And, multiple pieces of paste tin 16 are also prepared. The paste tin 16 is an excellent heat-transfer material and can be heated and softened to serve as a heat-transfer medium and bonding agent between the heat-transfer tubes 12, the first radiator 13, and the heat-transfer plate 15.

Figure 2:
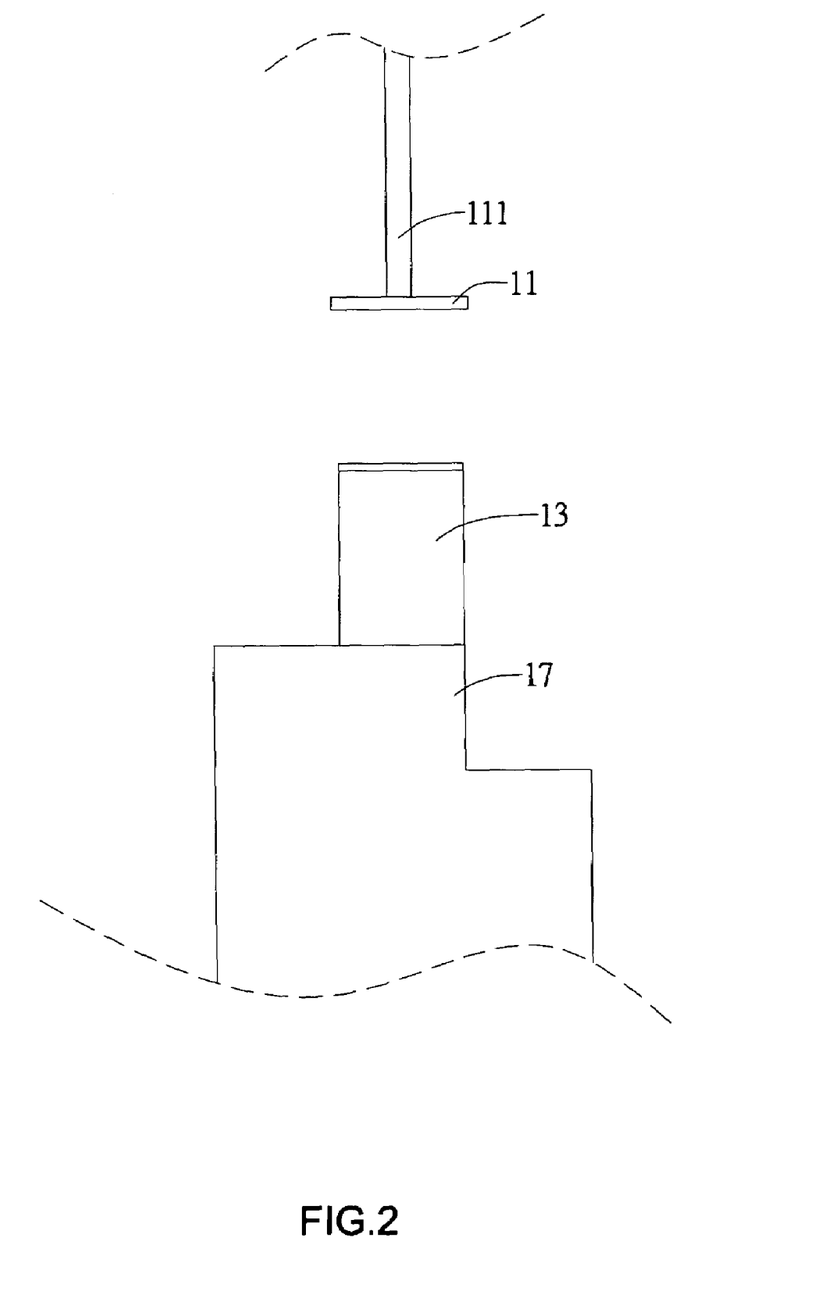
FIG. 2 is a side view showing a first radiator included in the radiating appliance to be processed is positioned on a fixing table.
Figure 3:
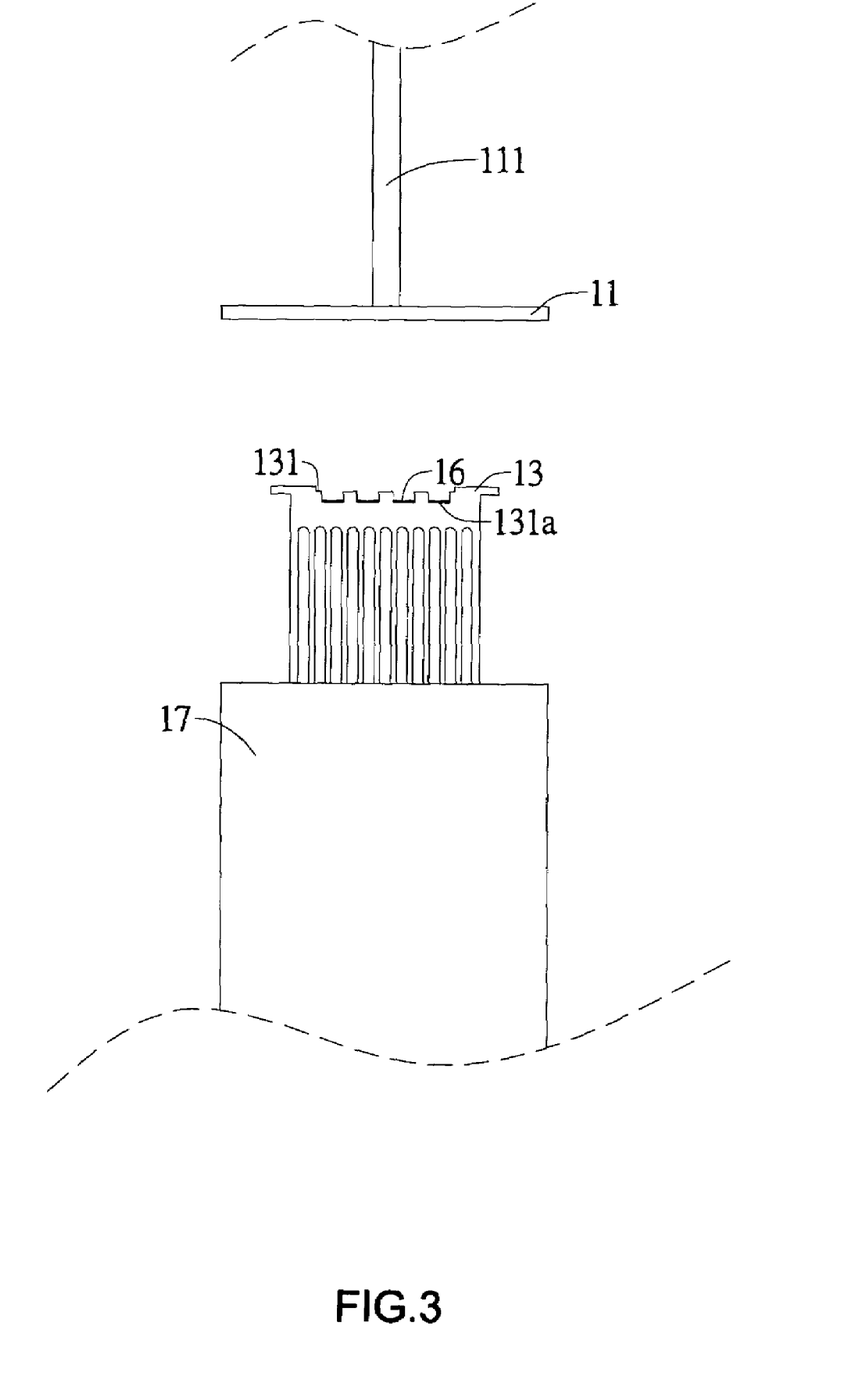
FIG. 3 is a front view of FIG. 2 showing paste tin is applied into grooves provided at a bottom the first radiator.

Please refer to FIGS. 2 and 3. In using the method of the present invention to process the above-described radiating appliance, first position the first radiator 13 on the fixing table 17 in an upside-down position, and then apply the pieces of paste tin 16 in the grooves 131a on the first radiator 13. The paste tin 13 is in a non-heated and non-molten state.

Figure 4:
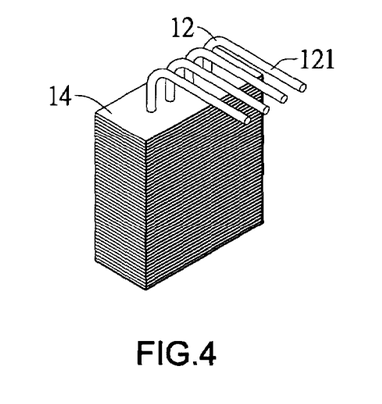
FIG. 4 is an assembled perspective view showing heat-transfer tubes are connected at a heat-dissipating end to a second radiator included in the radiating appliance to be processed using the method of the present invention.
Figure 5:
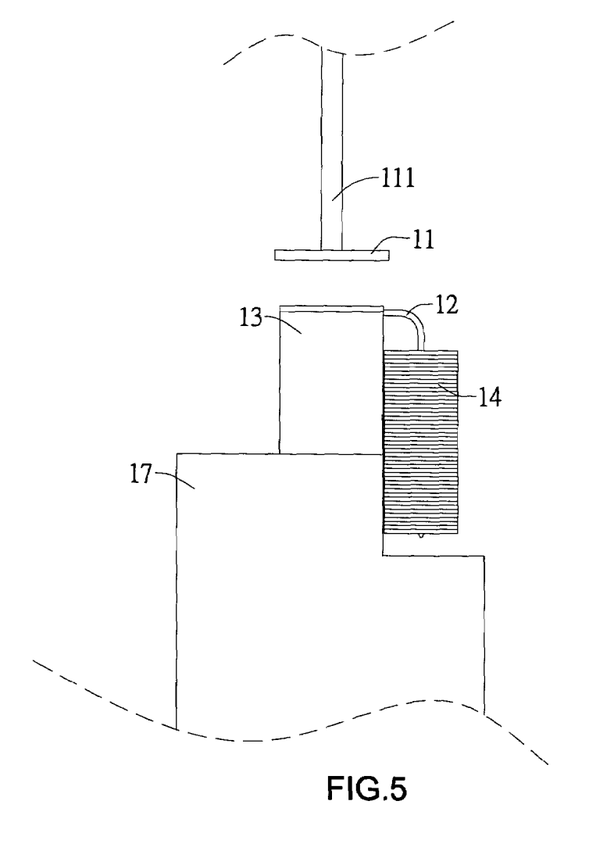
FIG. 5 is a side view showing the second radiator is positioned on the fixing table.
Figure 6:
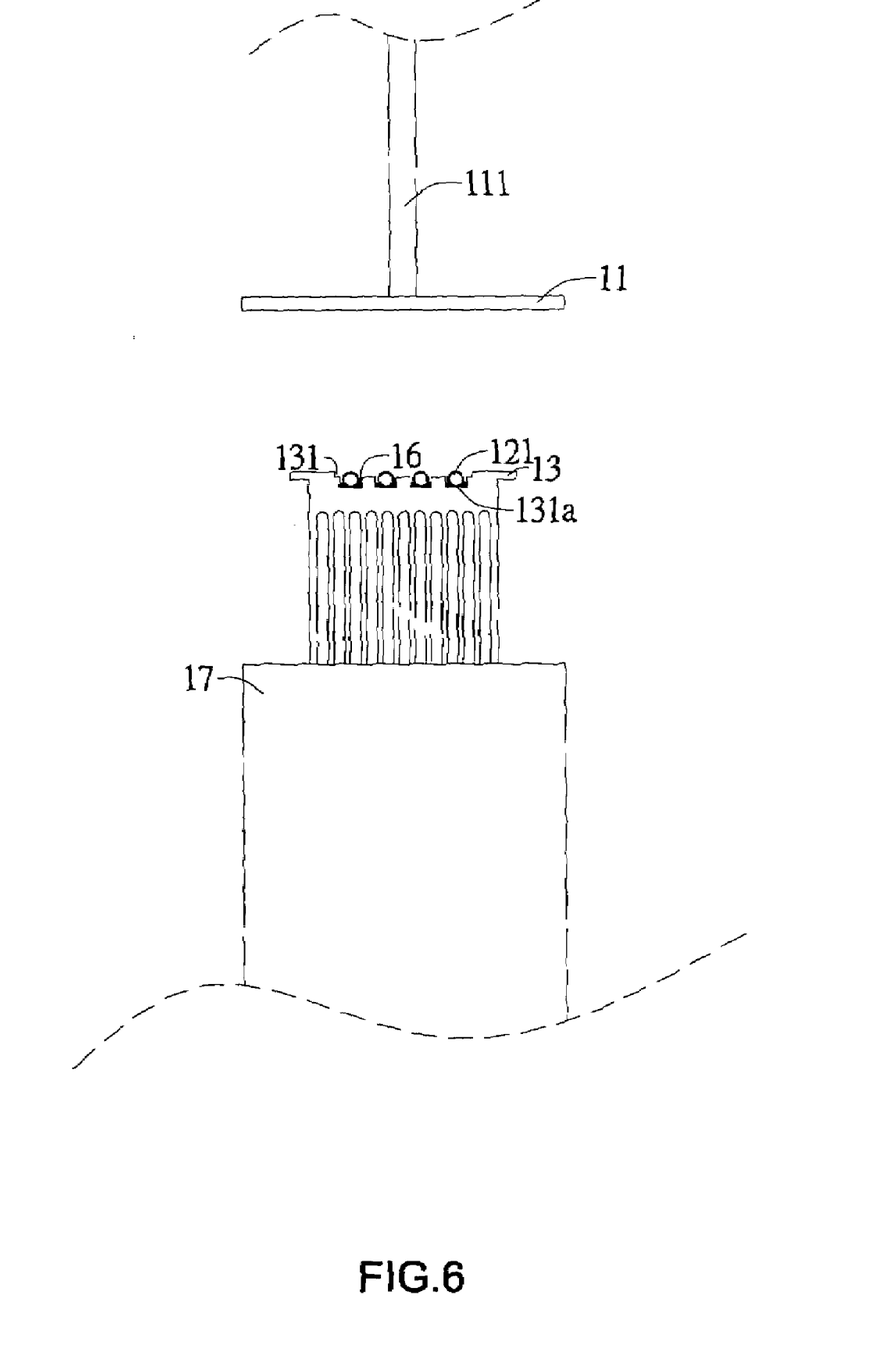
FIG. 6 is a front view showing the heat-transfer tubes are connected at a heat-receiving end to the first radiator.

As shown in FIGS. 4, 5, and 6, the right-angled heat-transfer tubes 12 are fixedly connected to the second radiator 14 by extending respective heat-dissipating ends 122 into the through holes 141 on the second radiator 14. The other end of the respective heat-transfer tubes 12 are heat-receiving ends 121, which are separately positioned in the grooves 131a of the first radiator 13 to locate above the paste tin 16.

Figure 7:
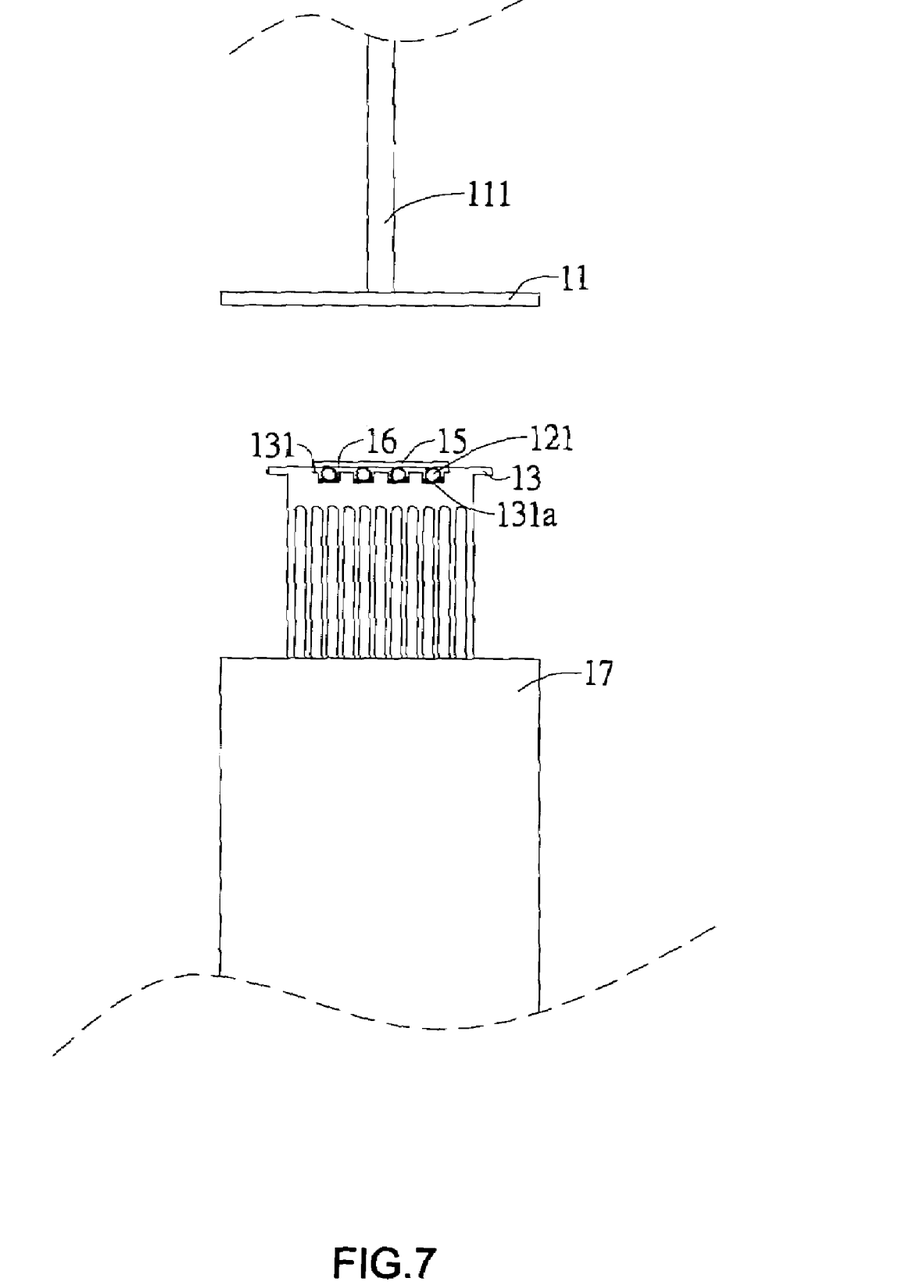
FIG. 7 is a front view showing a heat-transfer plate is positioned in front of a recess on the first radiator.
Figure 8:
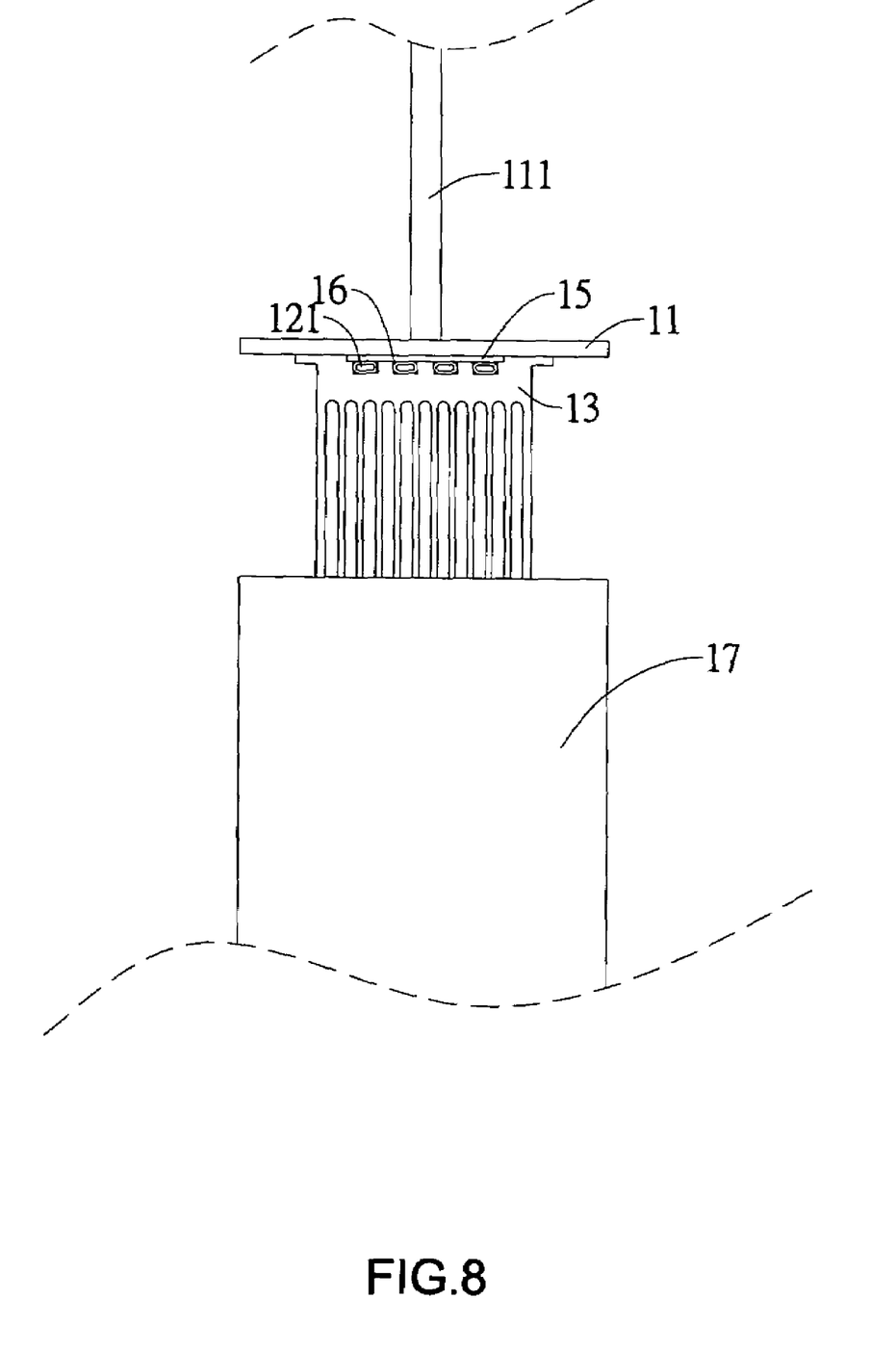
FIG. 8 is a front view showing a flat pressure plate is used to apply a pressure on the heat-transfer plate.

The heat-transfer plate 15 is then positioned in front of the recess 131 of the first radiator 13, as shown in FIG. 7. Then, the flat pressure plate 11 is driven by the driving arm 111 to move to a top of the heat-transfer plate 15 and apply a pressure thereto, so that the heat-transfer plate 15 is pressed into the recess 131, as shown in FIG. 8. At this point, the heat-receiving ends 121 of the round-sectioned heat-transfer tubes 12 are subjected to a pressure from the downward pressed heat-transfer plate 15 and flattened to produce an increased contact area with the first radiator 13. Meanwhile, the flat pressure plate 11 is kept heated to a high temperature, so that the paste tin 16 in the grooves 131*a* is heated and molten to ensure effective contact of the heat-transfer tubes 12 with the first radiator 13, and the heat-transfer tubes 12 with the heat-transfer plate 15. The molten paste tin 16 also serves as a bonding agent to firmly hold the heat-transfer tubes 12 to the grooves 131*a* of the first radiator 13, and the heat-transfer plate 15 to the recess 13.

Figure 9:
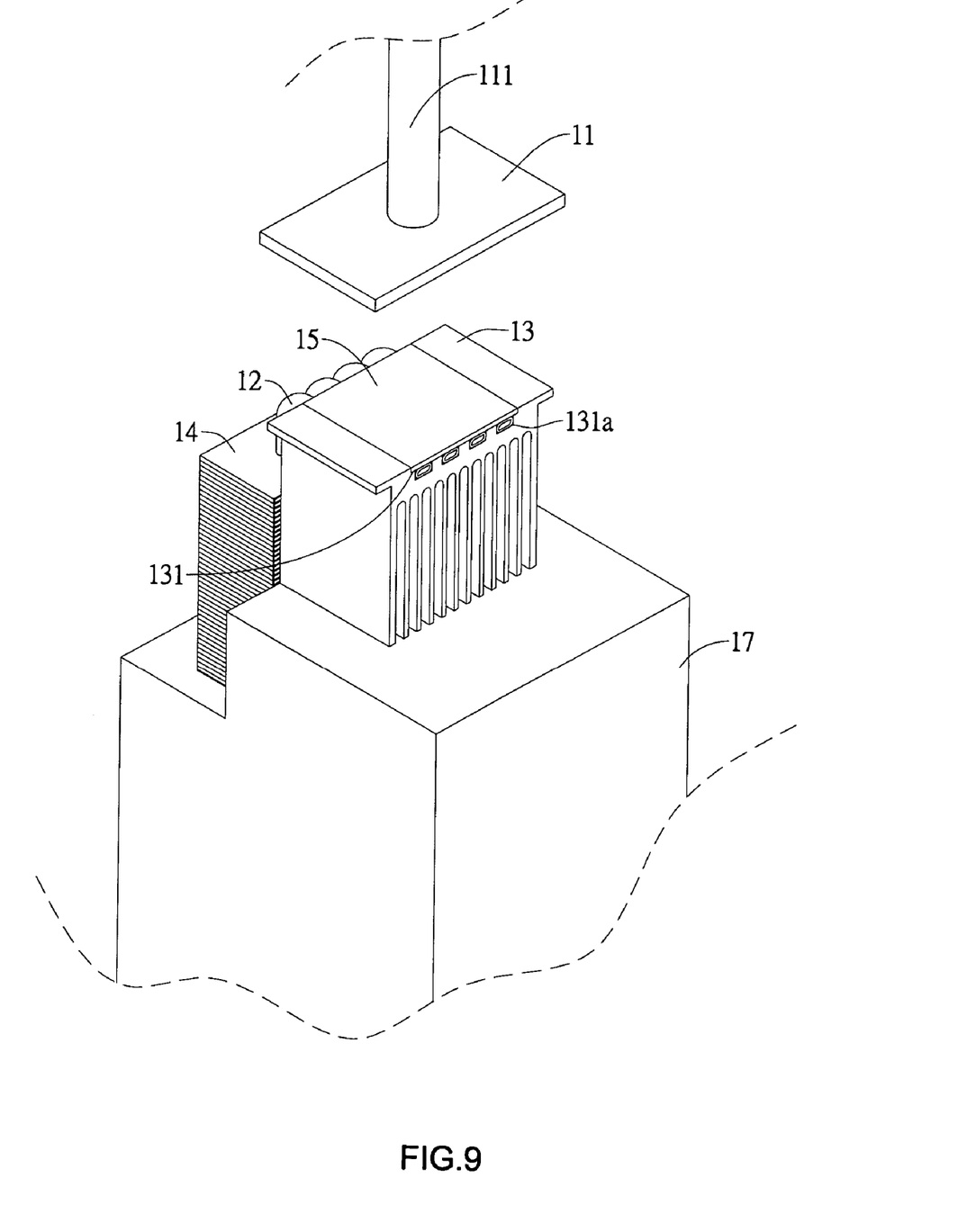
FIG. 9 is an assembled perspective view of the radiating appliance having been processed using the method of the present invention.

FIG. 9 shows an integral radiating appliance assembled from the heat-transfer plate 15, the heat-transfer tubes 12, the first radiator 13, and the second radiator 14 after the heat-transfer plate 15 is heated and pressed via the flat pressure plate 11.

More specifically, the processing method for the above-structured radiating appliance according to the present invention includes the following steps:

1. Positioning the unheated and solid-state paste tin 16 in the grooves 131*a* of the first radiator 13;
2. Fixedly connecting the heat-dissipating ends 122 of the heat-transfer tubes 12 to the through holes 141 on the second radiator 14;
3. Positioning the heat-receiving ends 121 of the heat-transfer tubes 12 in the grooves 131*a* to locate above the paste tin 16;
4. Positioning the heat-transfer plate 15 in front of the recess 13 of the first radiator 13; and
5. Driving the flat pressure plate 11 via the driving arm 111 to a position above the first radiator 13 to apply a downward pressure on the heat-transfer plate 15, so as to press the heat-transfer plate 15 into the recess 131 and accordingly flatten the heat-receiving ends 121 of the heat-transfer tubes 12 in the grooves 131*a* below the heat-transfer plate 15, producing increased contact areas with the first radiator 13; and heating the flat pressure plate 11 in contact with the heat-transfer plate 15, so that the paste tin 16 in the grooves 131*a* below the heat-transfer tubes 12 is heated and molten to effectively contact the heat-transfer tubes 12 with the first radiator 13, and the heat-transfer tubes 12 with the heat-transfer plate 15. The molten paste tin 16 also firmly bonds the heat-transfer tubes 12 to the grooves 131*a* of the first radiator 13, and the heat-transfer plate 15 to the recess 13.

The present invention has been described with a preferred embodiment thereof and it is understood that many changes and modifications in the described embodiment can be carried out without departing from the scope and the spirit of the invention that is to be limited only by the appended claims.

What is claimed is:

1. A processing method for radiating appliance, comprising the steps of:
 a. positioning unheated and solid-state paste tin in grooves provided in a recess formed on a radiator;
 b. positioning heat-receiving ends of a plurality of heat-transfer tubes in said grooves to locate above said paste tin;
 c. positioning a heat-transfer plate in front of said recess on said radiator; and
 d. driving a flat pressure plate via a driving arm to a position above said radiator to apply a downward pressure on said heat-transfer plate, so as to press said heat-transfer plate into said recess and accordingly flatten said heat-receiving ends of said heat-transfer tubes in said grooves below said heat-transfer plate, making said flattened heat-transfer tubes have increased contact areas with said radiator; and heating said flat pressure plate in contact with said heat-transfer plate, so that said paste tin in said grooves below said heat-transfer tubes is heated and molten to effectively contact said heat-transfer tubes with said radiator, and said heat-transfer tubes with said heat-transfer plate; said molten paste tin also firmly bonding said heat-transfer tubes to said grooves on said radiator, and said heat-transfer plate to said recess on said radiator.

2. The processing method for radiating appliance as claimed in claim 1, wherein said heat-transfer plate is made of copper that has excellent heat-transfer capability.

3. The processing method for radiating appliance as claimed in claim 1, wherein said flat pressure plate is made of copper that has excellent heat-transfer capability.

4. The processing method as claimed in claim 1, wherein the heat-receiving ends of the heat-transfer tubes are flattened simultaneously with the heating and melting of the paste tin.

5. The processing method as claimed in claim 1, wherein said heat-transfer plate and said heat-transfer tubes are simultaneously fixed to said radiator.

6. The processing method as claimed in claim 1, wherein said heat-transfer tubes are round in cross section.

7. The processing method as claimed in claim 6, wherein said grooves have a rectangular cross section.

\* \* \* \* \*